Figure 1:
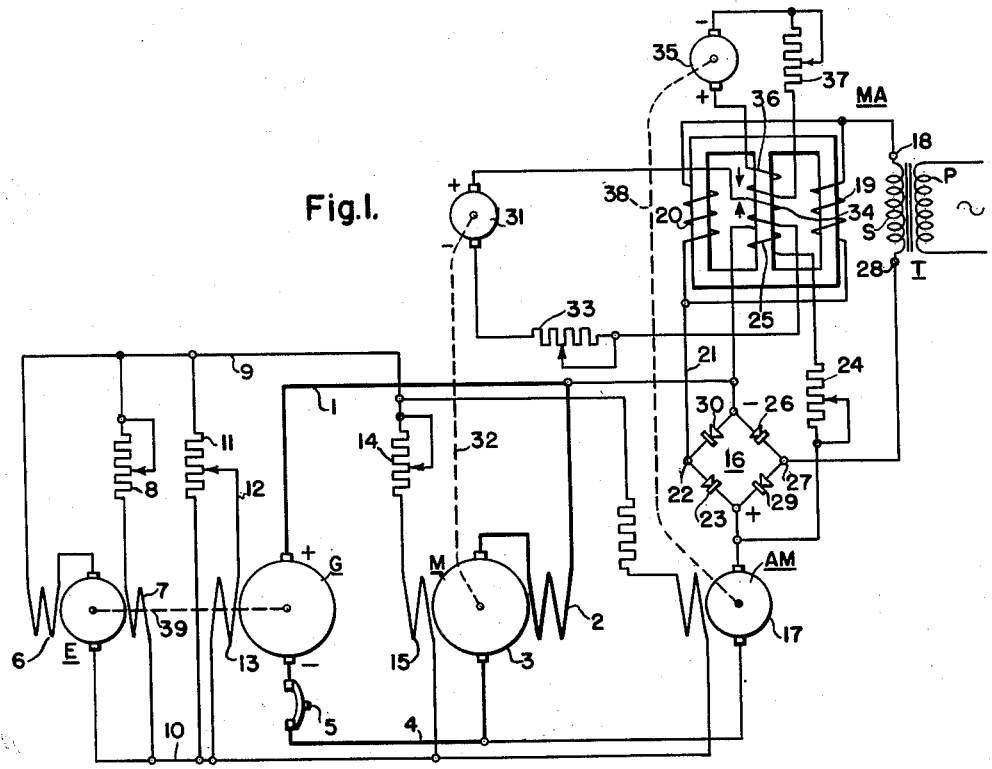

Jan. 19, 1954  M. H. FISHER  2,666,878
MAGNETIC AMPLIFIER SPEED REGULATOR CONTROL
Filed Oct. 13, 1951

WITNESSES:
John E. Heasley
W. C. Groome

INVENTOR
Martin H. Fisher.
BY
Paul E. Friedmann
ATTORNEY

Patented Jan. 19, 1954

2,666,878

UNITED STATES PATENT OFFICE 2,666,878

MAGNETIC AMPLIFIER SPEED REGULATOR CONTROL

Martin H. Fisher, Pittsburgh, Pa., assignor to Westinghouse Electric Corporation, East Pittsburgh, Pa., a corporation of Pennsylvania Application October 13, 1951, Serial No. 251,176

13 Claims. (Cl. 318—72)

My invention relates to electric systems of control and more particularly to systems of control for matching the speed of a plurality of direct-current motors.

Many processing lines in industry are sectionalized with each section being driven by a separate motor and wherein the speeds of the motors must be at all times matched even though the processing line is to operate at various speeds over a fairly wide speed range.

The various sections of the drive vary widely in power requirements. Often there is a relatively large main motor and several smaller motors, often of different sizes, which are required to follow the speed of the main motor within a given accuracy over the entire speed range of the whole drive.

Motors of varying sizes, unless of very special related designs, have different counterelectromotive force for the same speed, and the loads on the various sections of a drive are subject to change due to process changes, friction variations, or other changing load characteristics.

Over a very limited speed variation proper corrections may be effected by the use of equalizer resistors and shunt field adjustment. When the drive motors are operated over a speed range, they must be selected oversize to reduce the IR drops, and/or means must be provided to overcome and equalize the IR drops.

One way to equalize the motor counterelectromotive forces is to provide a booster in the armature circuit of each motor in the drive having an IR drop greater than that of the motor having the minimum drop. By this prior art method boosters and regulators are used to cause the auxiliary sections of a drive to match the speed of the main motor. Such involved apparatus is quite expensive, and quite space consuming, especially when the individual power requirements of the auxiliary sections are relatively low requiring motors of five horsepower or less.

One broad object of my invention is the provision of reliable relatively inexpensive means for effecting speed matching of the respective auxiliary drives, of a sectional drive, with the speed of the main motor of the drive.

It is also a more specific object and aim of my invention to eliminate, in a sectional drive, the booster and regulator apparatus by the substitution of a simple magnetic amplifier circuit for each auxiliary drive.

It is also an object of my invention to provide a magnetic amplifier control for a motor that produces a control effect that is a function of the motor speed, and the speed of some other motor to thus effect a matching of the speed of the motor to the said other motor, but is independent of the motor load current.

Figure 2:
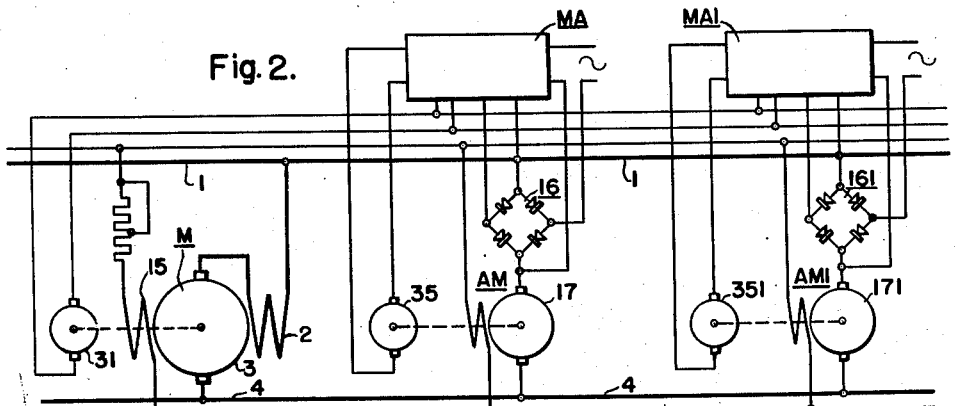

Other objects and advantages will become more apparent from a study of the following more detailed specification and a study of the accompanying drawing, in which:

Figure 1 shows diagrammatically the details of my system of control as applied to a single auxiliary motor; and Fig. 2 shows, rather schematically, how my system of control for a single auxiliary drive may be applied to two or more auxiliary drives.

In Fig. 1, the main generator G is shown connected in a loop circuit with the main motor M. The loop circuit may be traced from the positive generator terminal through lead 1, motor series field 2, the motor armature 3, lead 4, and switch 5 to the negative terminal of the main generator.

The exciter E and main generator G are coupled to the same shaft 39 driven from some relatively large constant speed main motor, not shown.

The exciter has its own series field winding 6, and shunt field winding 7, the excitation of which is controlled by the rheostat 8. The main generator G and the exciter E are driven at constant speed and the adjustment of the rheostat 8 is such that the voltage across leads 9 and 10 is held at a constant value.

A potentiometer type rheostat 11 is connected directly across the leads 9 and 10 and the generator field winding 13 is connected at any selected point on the potentiometer rheostat 11 by means of lead 12 so that the generator voltage across leads 1 and 4 may be varied at will. The main motor M and all the auxiliary motors, as the auxiliary motor AM, are thus subject to a Ward-Leonard type of speed control. The main motor has the separately excited field 15 and its control rheostat 14 connected directly across leads 9 and 10.

The main motor M is the "lead" motor and usually, but not necessarily, is the largest motor in the drive. A full-wave rectifier, as the rectifiers 16, 161, etc. (see Fig. 2), is connected in series with each of the respective motor armatures 17, 171, etc. of each auxiliary motor, AM, AM1, etc. The rectifier is preferably of the dry type and must have a current rating of at least the maximum continuous motor armature current expected for the motor with which it is to coact, and it must be connected to pass the power in the correct direction.

Fig. 2 shows a plurality of auxiliary motors and the rectifiers and magnetic amplifiers associated with each auxiliary motor. For an understanding of my invention, a study of the control for a single auxiliary motor, as the motor AM, shown in Fig. 1, will suffice.

It will be noted that the full-wave rectifier 16 is connected in series with the armature 17, and this series circuit is connected directly across the leads 1 and 4.

The alternating-current terminals 22 and 27 of the rectifier 16 are connected through the magnetic amplifier MA to the terminals 18 and 28 of the secondary S of transformer T having its primary winding P connected to the alternating-current leads shown. The transformer T must be so selected that its secondary voltage is sufficient to supply the IR drop of the auxiliary motor AM and the IR drop of the magnetic amplifier alternating-current circuit. This alternating-current circuit for the magnetic amplifier may, for one-half cycle, be traced from the upper terminal 18 of the transformer secondary S through the main, or alternating-current, windings 19 and 20, lead 21, the input terminal 22, the leg 23 of rectifier 16, the adjustable resistor 24, the self-saturating winding 25, the leg 26 of the rectifier, the rectifier input terminal 27 to the lower terminal of the secondary S. Windings 19 and 20 may be connected in parallel, as shown, or may be connected in series. For the second half cycle the circuit proceeds from the terminal 28 to the input terminal 27, leg 29 of the rectifier, adjustable resistor 24, self-saturating winding 25, leg 30 of the rectifier 16, the input terminal 22, the windings 19 and 20 to the terminal 18.

The magnetic amplifier MA is provided, in addition to the direct-current winding, namely the self-saturating winding 25 and the two alternating-current windings 19 and 20, with the pattern winding 34 and the control winding 36. The pattern winding is connected in a loop circuit including the tachometer generator 31, coupled to the main motor M by the shaft 32, the adjusting resistor 33 and the pattern winding 34. The voltage output of the tachometer generator is thus directly proportional to the speed of the main motor.

The control winding 36 is connected in the loop circuit including the tachometer generator 35, coupled to the auxiliary motor by shaft 38, the control winding 36, and the draw adjusting resistor 37. The winding 36 is thus excited directly proportional to the speed of the auxiliary motor AM.

In practice, the self-saturating winding 25 is designed and so adjusted to supply all the ampere-turns necessary to saturate the magnetic amplifier, whereas the windings 34 and 36 are designed and so adjusted as to have essentially equal and opposite ampere-turn values and thus the magnetic amplifier will regulate the speed of the auxiliary motor AM.

As mentioned hereinbefore, the magnetic amplifier MA supplies the IR drop of the auxiliary motor AM and its own IR drop and at the same time matches the speed of motor AM to the speed of the main motor M.

My invention has general utility in many industrial processes, however, to bring out the advantages of my contribution to the art, I shall assume the showing in Fig. 1 is an application to a rubber mill.

In such application, having a particular application in mind, the main motor is a 500 H. P., 250 volt motor having an IR drop of 8 volts whereas one of the auxiliary motors as AM is a 5 H. P., 250 volt motor having an IR drop of 20 volts.

In a rubber mill the IR drop for the main motor and the auxiliary motors is about the same for the threading speed of 14 yards per minute and for the full speed of 140 yards per minute. However, even if this is not the case my control automatically matches the speeds of the motors because the speed matching is independent of the armature loads of the various motors.

At top speed the counterelectromotive force of the main motor is 250 less 8, or 242 volts, whereas that of the auxiliary motor 250 less 20 or 230 volts.

At threading speed the main motor applied voltage is 24.2+8 or 32.2 volts. To get a corresponding speed on the auxiliary motor an applied voltage of 23+20, or 43 volts is needed.

Since the auxiliary motor calls for an applied voltage of 43 volts, whereas the main motor requires only an applied voltage of 32.2 volts, it is apparent that the shortage, to obtain speed matching, must be supplied to the auxiliary motor without affecting the applied voltage on the main motor.

My system of control accomplishes the desired result most effectively with apparatus that is simple and relatively inexpensive. For example, the rectifier 16 which is probably the most expensive item per weight need be rated to supply only the voltage difference, or shortage, and have a rating to carry the relatively low armature current of the auxiliary motors.

It will be noted that I utilize only simple and standard low cost parts in my control. Further, the amount of control power required is relatively small allowing the use of low cost and accurate pilot, that is, tachometer generators. Draw adjustment, if the drive is for a web processing drive or similar application, can be readily accomplished by the use of the small draw adjusting rheostat, or resistor, 37.

While I have shown but one control in detail and have shown but one application thereof, I do not wish to be limited to the single embodiment. Such embodiments as fall within the spirit of my invention and fall within the scope of the claims hereto appended also constitute my invention.

I claim as my invention:

1. In a system of control for a sectional drive, in combination, a main direct-current motor having a field winding excited at any selected value and having an armature winding energized from supply terminals to operate at any selected speed by voltage changes of the supply terminals, an auxiliary direct-current motor having an armature winding and having a field winding excited at any selected constant potential, a full-wave rectifier having alternating-current input terminals and direct-current output terminals, the armature winding of said auxiliary motor being connected in series with the output terminals of the rectifier, a magnetic amplifier having output terminals connected to the input terminals of the rectifier, said amplifier having control windings responsive respectively to the speed of the main motor, the speed of the auxiliary motor, and the output of the magnetic amplifier, whereby the output terminals of the rectifier supply the auxiliary motor with an additive voltage sufficient to compensate for the IR drop of the auxiliary motor.

2. In a control for a sectional drive, in combination, direct-current supply terminals, a main motor, an auxiliary motor, a magnetic amplifier, and a full-wave rectifier connected in series with the auxiliary motor, the connection being such that the direct-current output terminals of the rectifier are in series with the auxiliary motor, control windings for the magnetic amplifier energized respectively as a function of the speed of the main motor, the speed of the auxiliary motor, and the output of the magnetic amplifier, said magnetic amplifier having output terminals connected to the alternating-current input terminals of the rectifier to thus supply a boosting voltage to the auxiliary motor.

3. In a system of control in combination, a pair of direct-current supply terminals supplied with direct-current voltage that varies from a selected low value to a selected higher value, a lead motor connected to the terminals, an auxiliary motor having one of its armature terminals connected to one of the supply terminals, a full-wave rectifier having one of its direct-current terminals connected to the other supply terminal and having its other direct-current terminal connected to the other armature terminals of the auxiliary motor, and means responsive to the speed difference between the motors for supplying an alternating potential to the alternating-current terminals of the rectifier to effect a reduction in the speed difference.

4. In a system of control for matching the speed of several direct-current motors, in combination, direct-current supply terminals energized with variable voltage, a lead motor connected to the supply terminals, a plurality of follower motors, a plurality of full-wave rectifiers, each follower motor being connected in series with one rectifier and connected to the supply terminals, and a plurality of speed responsive means each having an output proportional to the speed difference between the lead motor and one of the follower motors, and means for supplying each full-wave rectifier with an alternating-current proportional to the speed difference between the lead motor and the follower motor with which the rectifier is connected to thus effect speed matching of all the motors.

5. In a system of control for matching the speed of two direct-current motors, in combination, a pair of direct-current supply terminals energized with variable voltage, a lead motor connected to the supply terminals, a follower motor, a full-wave rectifier connected in series with the follower motor, the rectifier and follower motor being connected to the supply terminals, and means for supplying the input terminals of the rectifier with an alternating current as a function of the speed difference of the motors to supply a voltage component to the follower of sufficient magnitude and of a polarity sense to effect a matching of the speed of the follower motor to the speed of the lead motor.

6. In a system of control for matching the speed of two direct-current motors, in combination, a lead motor, a pair of direct-current supply terminals for the lead motor energized with a voltage that is varied from a given minimum to a selected maximum to thus vary the speed of the lead motor, connected to the supply terminals, from a selected low speed to maximum speed, a follower motor, a full-wave rectifier having two alternating current input terminals and two direct current output terminals, one output terminal being connected to one supply terminal and the other output terminal being connected to one armature terminal of the follower motor and the other armature terminal of the follower motor being connected to the other supply terminal, whereby the speed of the follower motor is a function of the voltage of the supply terminals and the component of voltage appearing at the output terminals of the rectifier, and electromagnetic means for controlling the voltage output of the rectifier as a function of the speed difference between the lead motor and the follower motor.

7. In a system of control for matching the speed of two direct-current motors, in combination, a lead motor, a pair of direct-current supply terminals for the lead motor energized with a voltage that is varied from a given minimum to a selected maximum to thus vary the speed of the lead motor, connected to the supply terminals, from a selected low speed to maximum speed, a follower motor, a full-wave rectifier having two alternating-current input terminals and two direct-current output terminals, one output terminal being connected to one supply terminal and the other output terminal being connected to one armature terminal of the follower motor and the other armature terminal of the follower motor being connected to the other supply terminal, whereby the speed of the follower motor is a function of the voltage of the supply terminals and the component of voltage appearing at the output terminals of the rectifier, a magnetic amplifier having main windings energized with alternating-current and connected in series with the input terminals of the rectifier, and control winding means for the magnetic amplifier responsive to the speed difference between the lead motor and the follower motor to thus provide the follower motor with a voltage component decreasing the speed difference between the two motors.

8. In a system of control for matching the speed of two direct-current motors, in combination, a lead motor, a pair of direct-current supply terminals for the lead motor energized with a voltage that is varied from a given minimum to a selected maximum to thus vary the speed of the lead motor, connected to the supply terminals, from a selected low speed to maximum speed, a follower motor, a full-wave rectifier having two alternating-current input terminals and two direct-current output terminals, one output terminal being connected to one supply terminal and the other output terminal being connected to one armature terminal of the follower motor and the other armature terminal of the follower motor being connected to the other supply terminal, whereby the speed of the follower motor is a function of the voltage of the supply terminals and the component of voltage appearing at the output terminals of the rectifier, a magnetic amplifier having main alternating-current windings energized with alternating-current, said main windings being connected in series with the rectifier whereby the rectifier input terminals are energized as a function of the effective impedance of the main windings, direct-current saturation control windings, said control windings including a self-saturating winding and winding means responsive to the speed difference between the motors, whereby the rectifier provides a voltage component to the follower motor to cause the follower motor to match its speed to that of the lead motor.

9. In a system of control for matching the speed of two direct-current motors, in combination, a lead motor, a pair of direct-current supply terminals for the lead motor energized with a voltage that is varied from a given minimum to a selected maximum to thus vary the speed of the lead motor, connected to the supply terminals, from a selected low speed to maximum speed, a follower motor, a full-wave rectifier having two alternating-current input terminals and two direct-current output terminals, one output terminal being connected to one supply terminal and the other output terminal being connected to one armature terminal of the follower motor and the other armature terminal of the follower motor being connected to the other supply terminal, whereby the speed of the follower motor is a function of the voltage of the supply terminals and the component of voltage appearing at the output terminals of the rectifier, a magnetic amplifier having main alternating-current windings energized with alternating current, said main windings being connected in series with the rectifier whereby the rectifier input terminals are energized as a function of the effective impedance of the main windings, direct-current saturation control windings, said control windings including a self-saturating winding, a winding energized as a function of the speed of the lead motor and a winding energized as a function of the speed of the follower motor, whereby the rectifier provides a voltage component to the follower motor in the sense to decrease the speed difference between the two motors.

10. In a system of control for matching the speed of the two direct-current motors, in combination, a lead motor, a pair of direct-current supply terminals for the lead motor energized with a voltage that is varied from a given minimum to a selected maximum to thus vary the speed of the lead motor, connected to the supply terminals, from a selected low speed to maximum speed, a follower motor, a full-wave rectifier having two alternating-current input terminals and two direct-current output terminals, one output terminal being connected to one supply terminal and the other output terminal being connected to one armature terminal of the follower motor and the other armature terminal of the follower motor being connected to the other supply terminal, whereby the speed of the follower motor is a function of the voltage of the supply terminals and the component of voltage appearing at the output terminals of the rectifier, a magnetic amplifier having main alternating-current windings energized with alternating current, said main windings being connected in series with the rectifier whereby the rectifier input terminals are energized as a function of the effective impedance of the main windings, direct-current saturation control windings, said control windings including a self-saturating winding, a first tachometer generator driven at the speed of the lead motor, a second tachometer generator driven at the speed of the follower motor, a saturating control winding of the magnetic amplifier connected to each tachometer.

11. In a system of control for matching the speed of the two direct-current motors, in combination, a lead motor, a pair of direct-current supply terminals for the lead motor energized with a voltage that is varied from a given minimum to a selected maximum to thus vary the speed of the lead motor, connected to the supply terminals, from a selected low speed to maximum speed, a follower motor, a full-wave rectifier having two alternating-current input terminals and two direct-current output terminals, one output terminal being connected to one supply terminal and the other output terminal being connected to one armature terminal of the follower motor and the other armature terminal of the follower motor being connected to the other supply terminal, whereby the speed of the follower motor is a function of the voltage of the supply terminals and the component of voltage appearing at the output terminals of the rectifier, a magnetic amplifier having main alternating-current windings energized with alternating current, said main windings being connected in series with the rectifier whereby the rectifier input terminals are energized as a function of the effective impedance of the main windings, a first tachometer generator coupled to the lead motor to thus have a voltage output proportional to the speed of the lead motor, a second tachometer generator coupled to the follower motor to thus have a voltage output proportional to the speed of the lead motor, a second tachometer generator coupled to the follower motor to thus have a voltage output proportional to the speed of the follower motor, direct-current saturation control windings for the magnetic amplifier, said saturation control windings including a self-saturating winding connected across the output terminals of the rectifier, a control winding connected to the first tachometer generator, and a second control winding connected to the second tachometer generator.

12. In a system of control for matching the speed of the direct-current motors, in combination, a lead motor, a pair of supply terminals energized with a voltage that may be varied at will to thus change the speed of operation of lead motor connected to the supply terminals, a follower motor, a rectifier connected in series with the follower motor, means for producing a voltage as a function of the speed of the lead motor, means for producing a voltage as a function of the follower motor, a magnetic amplifier, main windings and control windings for the amplifier, two of the control windings being energized respectively by the means producing voltages as a function of the speeds of the two motors, and circuit means connecting the rectifier to the magnetic amplifier to thus provide the follower motor with a voltage component as a function of the speed difference of the two motors.

13. In a system of control including a pair of direct-current motors connected to the same source of variable direct-current potential, in combination, a full-wave rectifier having its output terminals in series with one of the motors, a magnetic amplifier having its output terminals connected to the input terminals of the rectifier, said amplifier having a first, or self-saturating, control winding, a second control winding energized as a function of the speed of one motor and a third control winding energized as a function of the speed of the second motor.

MARTIN H. FISHER.

References Cited in the file of this patent
UNITED STATES PATENTS

| Number | Name | Date |
| --- | --- | --- |
| 1,926,275 | Fitz Gerald | Sept. 12, 1933 |